(No Model.)

D. D. DAVIES.
COVER FOR FRYING PANS, POTS, OR OTHER COOKING UTENSILS.

No. 496,820. Patented May 2, 1893.

WITNESSES:
J. A. C. Criswell
E. M. Clark

INVENTOR
D. D. Davies
BY
Munn & Co.
ATTORNEYS.

UNITED STATES PATENT OFFICE.

DAVID D. DAVIES, OF WILKES-BARRÉ, PENNSYLVANIA.

COVER FOR FRYING-PANS, POTS, OR OTHER COOKING UTENSILS.

SPECIFICATION forming part of Letters Patent No. 496,820, dated May 2, 1893.

Application filed August 11, 1892. Serial No. 442,750. (No model.)

*To all whom it may concern:*

Be it known that I, DAVID D. DAVIES, of Wilkes-Barré, in the county of Luzerne and State of Pennsylvania, have invented a new and useful Improvement in Covers for Frying-Pans, Pots, or other Cooking Utensils, of which the following is a full, clear, and exact description.

My invention consists in a cover for frying pans, pots or the like, having a suitable ventilating opening or openings in the central portion of its top, controlled by an adjustable valve or cap for the purpose of opening and closing the same as required, substantially as hereinafter described and more particularly pointed out in the claims.

Reference is to be had to the accompanying drawings forming a part of this specification, in which similar letters of reference indicate corresponding parts in all the figures.

Figure 1:
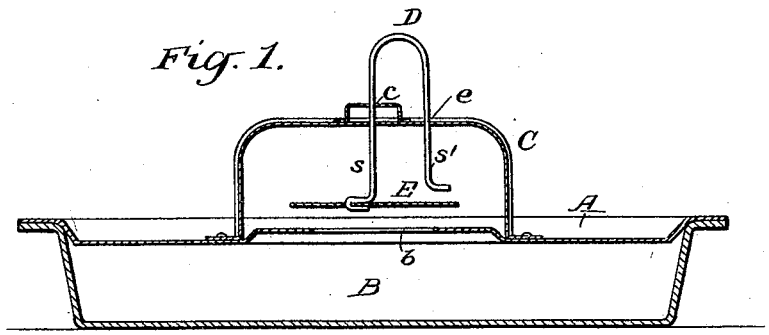
Figure 2:
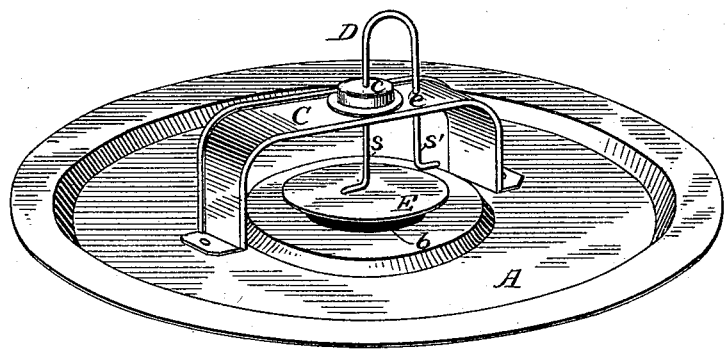

Figure 1 represents a central vertical section of my improved cover as applied to a cooking utensil; Fig. 2, a view in perspective of said cover, detached; and Fig. 3, a vertical section showing a modified construction of the cover.

A, indicates the cover which may be of the usual circular form, struck up out of sheet tin or otherwise suitably made and formed with an outer flange designed to sit down on the top of the frying-pan, pot or other cooking utensil B, or to be removed therefrom as required. Said cover is provided with a handle C, which may be made of wood or any suitable metal or material, but which is shown in Figs. 1 and 2 as centrally situated and as made of metal with a small cap $c$, on top to act as a guide to a spring D, and keep it from wabbling, which cap $c$ may be dispensed with when a wooden handle is used.

The cover A is provided with a central opening $b$, as shown in Figs. 1 and 2, or it might be with a series of openings. It will suffice, however, to speak of the same as a ventilating and steam escape opening controlled, that is, made capable of either being adjustably exposed or of being wholly closed by a valve E, which is here shown in the form of a metal plate or cap made to rise and fall and having attached to or connected with it the lower end of the one arm or leg $s$, of an upright inverted U-shaped spring D, which passes up in a sliding manner through the handle C at its cap $c$ and then has its other arm or leg $s'$, which has a lateral spring-like action, passed down through a contracted hole $e$ in the handle C and its end bent to prevent it from coming out of the handle. This spring D serves by the elasticity of its free leg or arm $s'$ which is not directly connected with the valve E, to exert a lateral binding action or effect on the walls of the aperture $e$ in the handle, and so to automatically hold the valve E at any desired adjustment of the latter from the opening $b$ to give a greater or less exposure to said opening, and the valve when closed will be kept shut by said spring.

Figure 3:
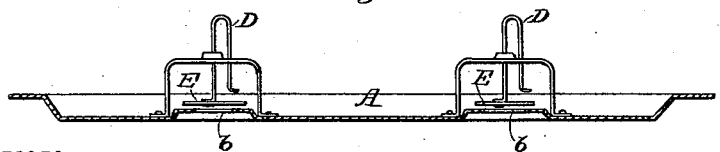

In Fig. 3 of the drawings, substantially the same construction is shown, but two ventilating openings $b$ are provided in the cover and each of them controlled by a separate valve E and spring D.

I do not restrict myself to the precise construction of valve for controlling the opening in the cover, as a horizontal slide valve, for instance, operated by a lever or otherwise might be used, but the construction herein shown and described is deemed the simplest and most effective.

My improved cover having a steam escape opening in the central portion of its body is applicable to cooking utensils generally, but more especially to frying-pans and pots, and it may be used either as a close cover or a ventilating one. Applied to a frying-pan, it enables the cook to fry a beefsteak, or other meat or fish or article, without greasing the stove or stewing the food being cooked. A greasy stove produces a smoky kitchen by burning of the fat. It also economizes the cooking by retaining in the pan with the meat all the richness of the latter, allowing only the steam or watery matter to escape, thus providing for a good supply of gravy which is not the case when the steam is retained in the pan by a close lid, as then the steam operates to restrict the temperature for frying purposes, and the moving of the close lid to one side, as is frequently done for escape of the steam, always allows for the escape of fat by spattering over the edge of the spider or pan, but the hole in the center of my cover only provides for the escape of steam.

As a ventilating pot cover, my improved cover allows the steam to escape through its raised center, thus producing a slight draft in under the outer edges of the cover and thereby preventing the boiling over of water when cooking meats or vegetables, also preventing much dirt and annoyance and danger from the scalding of children, and causing much less steam to be produced in the kitchen, which steam is often a detriment to the paper on the walls.

Having thus fully described my invention, I claim as new and desire to secure by Letters Patent—

1. A cover for frying-pans, pots and other cooking utensils provided with a central steam escape opening, in combination with an adjustable valve or cap over said opening operating to vary the exposure of said opening and to close it, and a spring adapted to automatically hold said valve in its adjusted position, essentially as set forth.

2. The combination, with the pan or pot cover A having a handle C and central steam escape opening $b$, of the raising and lowering valve E over said opening, and the inverted U-shaped spring D having one of its legs attached to the valve and its other leg free but both arranged to pass through the handle of the cover, substantially as shown and described and for the purpose or purposes specified.

DAVID D. DAVIES.

Witnesses:
ALVIN H. KRESGE,
JOHN CUBLE.